United States Patent
Gordner et al.

(10) Patent No.: US 11,092,234 B2
(45) Date of Patent: Aug. 17, 2021

(54) BRAKING DEVICE FOR TRANSMISSION GEARWHEELS

(71) Applicant: Bayerische Motoren Werke Aktiengesellschaft, Munich (DE)

(72) Inventors: Achim Gordner, Grossberghofen (DE); Stephan Fischer, Puchheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 382 days.

(21) Appl. No.: 16/131,877

(22) Filed: Sep. 14, 2018

(65) Prior Publication Data

US 2019/0017591 A1 Jan. 17, 2019

Related U.S. Application Data

(63) Continuation of application No. PCT/EP2017/055127, filed on Mar. 6, 2017.

(30) Foreign Application Priority Data

Mar. 16, 2016 (DE) ...................... 10 2016 204 282.3

(51) Int. Cl.
   *F16H 61/04* (2006.01)
   *F16D 21/04* (2006.01)
   *F16D 23/02* (2006.01)

(52) U.S. Cl.
   CPC ......... *F16H 61/0403* (2013.01); *F16D 21/04* (2013.01); *F16D 23/02* (2013.01);
   (Continued)

(58) Field of Classification Search
   CPC ................. F16H 61/0403; F16H 61/04; F16H 2061/0411; F16H 2061/0474; F16D 21/04
   (Continued)

(56) References Cited

U.S. PATENT DOCUMENTS

| 2,550,545 A * | 4/1951 | Findley ..................... F16H 3/12 |
| | | 192/3.63 |
| 3,645,366 A * | 2/1972 | Numazawa ........... B60W 30/18 |
| | | 477/85 |

(Continued)

FOREIGN PATENT DOCUMENTS

| AT | 514995 B1 | 8/2015 |
| CH | 331 929 A | 8/1958 |

(Continued)

OTHER PUBLICATIONS

International Search Report (PCT/ISA/210) issued in PCT Application No. PCT/EP2017/055127 dated Jul. 4, 2017 with English translation (seven pages).

(Continued)

*Primary Examiner* — Ha Dinh Ho

(74) *Attorney, Agent, or Firm* — Crowell & Moring LLP

(57) ABSTRACT

A drive system for a motor vehicle includes a separating clutch, a shiftable transmission, a drive machine, and a transmission gear wheel and a clutch device. In a first operating state either the clutch device or the transmission gear wheel is kinematically coupled to the transmission input shaft and in a second operating state both said clutch device and said transmission gear wheel are kinematically coupled in said manner thereto. The drive system comprises a braking device for transmitting a braking force in a non-contact manner in this first operating state from a first part to a second part of the braking device. In that the first part of the braking device is kinematically coupleable to the transmission input shaft and the second part is kinematically coupleable to the transmission gear wheel.

6 Claims, 1 Drawing Sheet

(52) U.S. Cl.
CPC ...... *F16H 61/04* (2013.01); *F16H 2061/0411* (2013.01); *F16H 2061/0422* (2013.01); *F16H 2061/0474* (2013.01)

(58) Field of Classification Search
USPC .......................................................... 74/339
See application file for complete search history.

(56) References Cited

U.S. PATENT DOCUMENTS

| | | | |
|---|---|---|---|
| 3,834,499 | A * | 9/1974 | Candellero ............ B60W 10/11 |
| 5,528,950 | A | 6/1996 | Organek et al. |
| 5,947,863 | A | 9/1999 | Grob et al. |
| 6,370,977 | B1 | 4/2002 | Kubo et al. |
| 8,452,503 | B2 * | 5/2013 | Bartels .................. B60W 10/02 |
| | | | 701/67 |
| 9,217,504 | B2 * | 12/2015 | Haug ................... F16H 61/0403 |
| 2004/0118652 | A1 * | 6/2004 | Muetzel ............ B60W 30/1819 |
| | | | 192/3.55 |
| 2005/0040000 | A1 | 2/2005 | Kelley, Jr. et al. |
| 2008/0109143 | A1 * | 5/2008 | Bartels ................ F16H 61/0403 |
| | | | 701/67 |
| 2009/0054201 | A1 | 2/2009 | Winkelmann et al. |
| 2010/0044183 | A1 | 2/2010 | Guggolz et al. |
| 2013/0046427 | A1 | 2/2013 | Hohenberg |
| 2013/0267369 | A1 | 10/2013 | Beck et al. |

FOREIGN PATENT DOCUMENTS

| | | |
|---|---|---|
| CN | 103270338 A | 8/2013 |
| CN | 103270338 B | 10/2015 |
| DE | 1 096 213 B | 12/1960 |
| DE | 100 00 625 A1 | 7/2000 |
| DE | 101 52 477 A1 | 5/2003 |
| DE | 103 50 932 A1 | 5/2004 |
| DE | 10 2006 025 277 A1 | 12/2007 |
| DE | 11 2006 003 374 A5 | 9/2008 |
| DE | 10 2011 051 532 A1 | 1/2013 |
| EP | 0 849 110 A2 | 6/1998 |
| JP | 5-12809 U | 2/1993 |
| JP | 8-312692 A | 11/1996 |
| JP | 2005-59849 A | 3/2005 |
| WO | WO 99/13236 A1 | 3/1999 |
| WO | WO 2007/073711 A1 | 7/2007 |
| WO | WO 2011/107276 A1 | 9/2011 |

OTHER PUBLICATIONS

German-language Written Opinion (PCT/ISA/237) issued in PCT Application No. PCT/EP2017/055127 dated Jul. 4, 2017 (six pages).
German-language Office Action issued in counterpart German Application No. 10 2016 204 282.3 dated Nov. 4, 2016 (five pages).
Chinese-language Office Action issued in counterpart Chinese Application No. 201780005771.1 dated Apr. 30, 2019 with English translation (14 pages).
Hindi-language Examination Report issued in Indian Application No. 201847038547 dated Feb. 16, 2021 with partial English translation (seven (7) pages).

* cited by examiner

BRAKING DEVICE FOR TRANSMISSION GEARWHEELS

CROSS REFERENCE TO RELATED APPLICATIONS

This application is a continuation of PCT International Application No. PCT/EP2017/055127, filed Mar. 6, 2017, which claims priority under 35 U.S.C. § 119 from German Patent Application No. 10 2016 204 282.3, filed Mar. 16, 2016, the entire disclosures of which are herein expressly incorporated by reference.

BACKGROUND AND SUMMARY OF THE INVENTION

The embodiments of the invention relate to a braking device for transmission gear wheels for reducing a shifting jolt when changing gear. Devices in accordance with the preamble of the invention include for example those disclosed in DE 10 2011 051 532 A1.

The embodiments of the invention is further explained below with reference to a motorbike having a shiftable transmission, this is not to be understood as limiting the embodiments of the invention to an application of this type.

In the case of motorbike transmissions, individual or all the shifting stages of the transmission are frequently not synchronized and furthermore motorbikes frequently comprise wet separating clutches between the driving internal combustion engine and the transmission. A wet clutch due to the conceptual design also transmits a drag torque in the opened state, in particular owing to the Newtonian shearing friction between the plates. This drag torque leads to a shifting jolt when shifting into the first gear when the motorbike is at a standstill in the case of an opened separating clutch since a part of the motorbike transmission is kinematically coupled to the rear wheel that is at a standstill, therefore is at a standstill, and the other part of the transmission is driven using the prevailing engine rotational speed of the internal combustion engine and this drag torque and therefore is rotating. If the first gear is engaged at this moment by means of producing a positive-locking connection, the part of the motorbike transmission that is driven by means of the drag torque is thus abruptly braked to a rotational speed of zero and a shifting jolt occurs.

DE 10 2011 051 532 A1 discloses to change the rotational speed of the internal combustion engine by means of controller intervention and thus to reduce the shifting jolt.

One of the objects of the invention is to provide a drive system for a motorbike having a small shifting jolt. This object is achieved by virtue of the inventive drive system.

A motor vehicle is understood to be a vehicle for conveying at least one person. It is preferred that in this sense a motor vehicle is understood to be a single-tracked vehicle, in particular a motorbike.

A drive machine is understood to be a drive motor that is configured so as to provide a drive power for overcoming driving resistances of the motor vehicle. It is preferred that a drive machine is understood to be an internal combustion engine having at least one or multiple cylinders. Furthermore, it is preferred that a drive machine is understood to be an electromechanical energy converter, preferably an electric motor/generator and a drive machine particularly preferably comprises a combination of two or more of the above-mentioned drive machines, it is particularly preferred that such a drive machine is configured as a so-called hybrid drive.

A shiftable transmission is understood to be a device for changing a transmission ratio between a transmission input shaft and a transmission output shaft in discreet stages. It is preferred that such a shiftable transmission is provided as a motorbike transmission having a plurality of discreet transmission ratios (gears). It is preferred that the gear having the greatest ratio, in other words the gear of the transmission, which is generally used to set off from a standstill, is referred to as first gear. Furthermore, it is preferred that at least one of these gears of the shiftable transmission is not synchronized, preferably at least the first gear, it is further preferred that a plurality of gears of this shiftable transmission is not synchronized, preferably all of the gears are not synchronized. Synchronization devices are known in the field of motor vehicle construction and are used, in particular in automobile transmissions, in order to adjust in a frictional-locking manner rotational speed differences between components that are configured so as to produce a positive-locking connection, such a frictional-locking rotational speed adjustment involving physical contact does not occur in the case of non-synchronized gears.

A separating clutch is understood to be a device that is arranged in the torque transmission direction from the drive machine to the shiftable transmission between said drive machine and shiftable transmission with the result that the torque transmission may be selectively interrupted by means of this separating clutch. It is preferred that such a separating clutch is provided as a multi-plate clutch and further preferably as a wet multi-plate clutch. It is preferred that a wet multi-plate clutch comprises a plurality of clutch plates. In the opened state of the clutches, said clutch plates are separated from one another and in accordance with the plan torque may not be transmitted to the clutch. In particular, owing to the lubrication of the wet multi-plate clutch lubricant is located between individual clutch plates and a specific drag torque is transmitted owing to the fluid friction, this may also be understood as Newtonian shearing friction.

A transmission input shaft is understood to be a shaft of the shiftable transmission and the drive power that may be provided by the drive machine may be transmitted to said transmission input shaft. It is preferred that the transmission input shaft may be directly connected to the separating clutch or is connected to said separating clutch and it is further preferred that this transmission input shaft may be connected selectively and in a torque-conducting manner to the drive machine by means of the separating clutch.

A transmission gear wheel is understood to be a gear wheel of the shiftable transmission and said transmission gear wheel is provided in said shiftable transmission so as to transmit torque. It is preferred that the shiftable transmission comprises a plurality of transmission gear wheels, of which it is preferred that individual transmission gear wheels may be selectively coupled in a kinematic manner to the transmission input shaft. It is further preferred that this kinematic coupling is realized by means of a positive-locking connection.

A clutch device is understood to be a device that is provided for the purpose of producing a positive-locking connection to at least one of the transmission gear wheels. It is preferred that the clutch device is connected to a transmission shaft of the shiftable transmission in a non-rotatable manner and preferably in a manner in which said clutch device may be able to displace axially. It is preferred that the clutch device comprises a sliding sleeve or a claw coupling for connecting one of the transmission gear wheels in a positive-locking manner to a transmission shaft of the shiftable transmission with the result that a kinematic coupling of this transmission gear wheel to the transmission input shaft may be selectively produced.

A kinematic coupling is understood to be a forced connection of the clutch device or the transmission gear wheel to the transmission input shaft. It is preferred that such a kinematic coupling leads to the fact that a movement of the transmission input shaft leads to a forced movement of the component that is kinematically coupled to said transmission input shaft. It is preferred that two components that are kinematically coupled to one another may be structurally separated from one another by means of preferably one or preferably multiple transmission stages.

A first operating state of the drive system is understood to be a state in which the separating clutch is in an opened state and either the clutch device or the transmission gear wheel is kinematically coupled to the transmission input shaft, wherein the in each case other of the two mentioned components is not kinematically coupled to the transmission input shaft.

An opened state of the separating clutch as stated is understood to be a state of said separating clutch in which torque may not be transmitted in accordance with the plan by means of said separating clutch.

It is preferred that a second operating state of the drive system is understood to be a state in which both the clutch device as well as the transmission gear wheel are kinematically coupled to the transmission input shaft. It is preferred that in this second operating state the separating clutch is furthermore in an opened state.

It is preferred that the drive system comprises a braking device for transmitting a braking force in a non-contact manner from a first part to a second part of the braking device. Furthermore, it is preferred that the first part of the braking device may be kinematically coupled to the transmission input shaft and the second part may be kinematically coupled to the transmission gear wheel. In particular, therefore a braking force may be transmitted from the transmission input shaft to the transmission gear wheel by means of the braking device in a non-contact manner.

In particular, by means of a drive system of this type, it is rendered possible prior to shifting into first gear to brake in a non-contact manner a transmission input shaft that has been accelerated by means of a drag torque that is produced by the separating clutch and thus to reduce or to avoid the shifting jolt that may occur when producing the positive-locking connection between the clutch device and the transmission gear wheel.

The braking device is configured as an eddy current brake. Eddy current brakes are known from the prior art and a particularly reliable drive system may be realized using said eddy current brakes.

The eddy current brake comprises a first part and a second part, wherein the braking force may be transmitted in a non-contact manner between these two parts. It is preferred that the first part of the eddy current brake is connected to the transmission input shaft in a non-rotatable manner. Furthermore, the second part of the eddy current brake is preferably connected to the transmission gear wheel in a non-rotatable manner. In particular, a particularly simple construction of the drive system in accordance with the invention may be realized by virtue of such a non-rotatable connection of the two parts of the eddy current brake to transmission gear wheel on the one hand and to the transmission input shaft on the other hand.

The first part of the eddy current brake is connected to the clutch device and is preferably at least in sections or preferably entirely received in this clutch device. It is preferred that the clutch device may be connected to a shaft hub connection in an axially movable manner but may be connected to the transmission input shaft in a non-rotatable manner.

The second part of the eddy current brake comprises a ferromagnetic region. It is preferred that this region comprises a permanent magnetic material as a component, preferably neodymium. It is preferred that this ferromagnetic region of the eddy current brake is configured for the purpose of producing an eddy current in the first part of the eddy current brake, in particular in the case of a relative movement of the first part with respect to the second part.

The first part of the eddy current brake comprises an electrically conductive region. It is preferred that this electrically conductive region is configured as an electric coil or preferably an electrically conductive insert. In particular, a particularly large braking effect may be achieved using the eddy current brake by means of an electric coil or electric insert.

In particular, in order to reduce the development of noise during the procedure of shifting into the first gear of the shiftable transmission, it is provided that the eddy current brake that is preferably integrated into the transmission gear wheel and the clutch device that is in particular configured as a sliding sleeve applies a braking torque so as to brake the transmission input shaft in a non-contact manner.

Other objects, advantages and novel features of the embodiments of the present invention will become apparent from the following detailed description of one or more preferred embodiments when considered in conjunction with the accompanying drawings, in which:

DETAILED DESCRIPTION OF THE DRAWINGS

Figure 1:
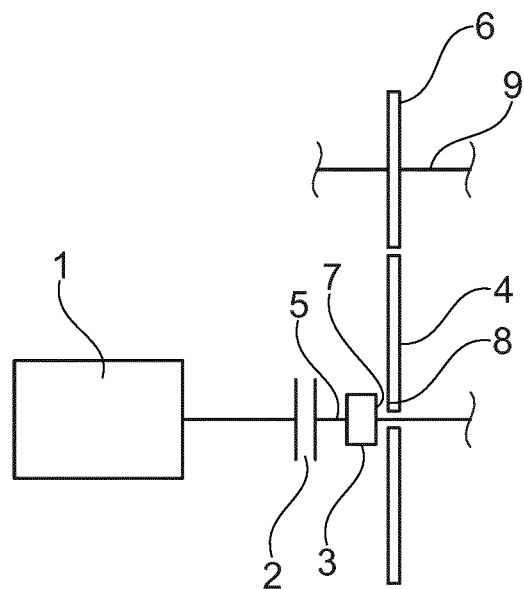
FIG. 1 is a schematic sectional view through a drive system.

FIG. 1 illustrates a schematic sectional view through the drive system. This drive system comprises an internal combustion engine 1. The internal combustion engine 1 provides its drive torque via the separating clutch 2 to the transmission input shaft 5 of a motorbike transmission. In the motorbike transmission, the transmission gear wheel 4 for the first gear may be connected via the sliding sleeve 3 in a non-rotatable manner to the transmission input shaft 5. In order to realize the first gear, the transmission gear wheel 4 meshes with the further transmission gear wheel 6 that is arranged on a further transmission shaft 9 that is arranged in an axis parallel manner with respect to the transmission input shaft 5. This further transmission shaft 9 is kinematically coupled to the rear wheel of the motorbike that the illustrated drive system is associated with, wherein this rear wheel is not illustrated.

From this configuration, it follows that when the motorbike is at a standstill in the case of a motorbike transmission that is known from the prior art the further transmission shaft 9, the further transmission gear wheel 6 and therefore the transmission gear wheel 4 are at a standstill. When the internal combustion engine is being operated, a drag torque is transmitted via the separating clutch 2 that is configured as a wet multi-plate clutch and said drag torque is produced by means of the shearing friction of the fluid in the wet multi-plate clutch 2. The transmission input shaft 5 is set into rotation by means of this drag torque. During the procedure of shifting into the first gear, in other words if the transmission gear wheel 4 is connected in a non-rotatable manner by means of the sliding sleeve 3 to the transmission input shaft 5, a shifting jolt occurs owing to the transmission gear wheel 4 that is at a standstill with respect to the rotating sliding sleeve 3 and said shifting jolt is generally perceived as uncomfortable. Furthermore, a jolt of this type has a negative effect on the serviceable life of the sliding sleeve 3 and/or the transmission gear wheel 4.

In the illustrated drive system, an eddy current brake 7, 8 is provided, the first part 7 of the eddy current brake is received in the sliding sleeve 3 and the second part 8 is received in the transmission gear wheel 4. This eddy current brake 7, 8 leads to the fact that when connecting the transmission gear wheel 4 to the transmission input shaft 5 via the sliding sleeve 3 a braking force is produced between the first part of the eddy current brake 7 and the second part of the eddy current brake 8 with the result that the rotating transmission input shaft 5 with respect to the transmission gear wheel 4 that is at a standstill is braked and the shifting jolt is consequently reduced.

Furthermore, it is advantageous that the induced eddy current depends upon the axial spacing of the first part 7 with respect to the second part 8 of the eddy current brake, in particular the transmission input shaft 5 therefore rotates in a practically lossless manner and a braking torque may only be applied if the sliding sleeve 3 approaches the transmission gear wheel 4 in order to produce the positive-locking connection.

Figure 2:
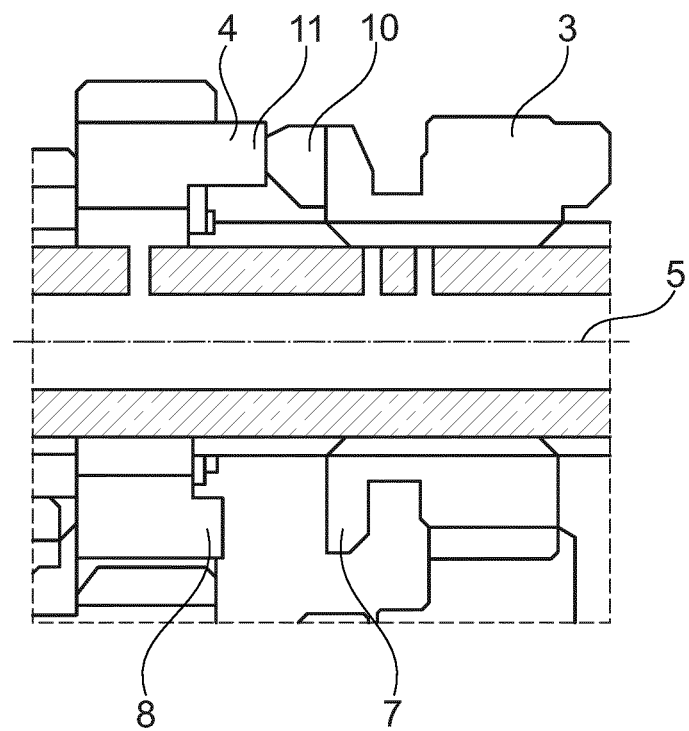
FIG. 2 is a sectional view through a transmission gear wheel and a sliding sleeve on the transmission input shaft.

FIG. 2 illustrates a part section through the transmission gear wheel 4, the sliding sleeve 3 and also the transmission input shaft 5. The transmission gear wheel 4 may be selectively connected by means of the sliding sleeve 3 to the transmission input shaft 5 the sliding sleeve 3 comprises an electric coil in the region 7. In the case of a relative rotational speed of the sliding sleeve 3 with respect to the transmission gear wheel 4, an eddy current is produced in said electric coil 7 by means of the neodymium magnet of the transmission gear wheel 4, said magnet being arranged in the region 8. This eddy current produces a magnetic field owing to Lenz's law and said magnetic field is oriented counter to the magnetic field that is produced and thus leads to braking the transmission input shaft 5 with respect to the transmission gear wheel 4 that is at a standstill and leads to a reduction of the shifting jolt when producing the positive-locking connection between the sliding sleeve 3 and the transmission gear wheel 4.

The regions 10, 11 on the sliding sleeve 3 and the transmission gear wheel 4 are configured so as to form a positive-locking connection between the sliding sleeve 3 and the transmission gear wheel 4. These regions 10, 11 are configured as a type of claw coupling.

The foregoing disclosure has been set forth merely to illustrate the embodiments of the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A drive system for a motor vehicle comprising:
    a separating clutch;
    a shiftable transmission;
    a drive machine that is selectively connected by means of the separating clutch to a transmission input shaft of the shiftable transmission; and
    a transmission gear wheel and a clutch device that is configured so as to produce a positive-locking connection to the transmission gear wheel, wherein
        in a first operating state either the clutch device or the transmission gear wheel is kinematically coupled to the transmission input shaft and in a second operating state both said clutch device and said transmission gear wheel are kinematically coupled thereto,
    the drive system comprises a braking device for transmitting a braking force in a non-contact manner in said first operating state from a first part to a second part of the braking device, and
    in that the first part of the braking device is kinematically coupleable to the transmission input shaft and the second part is kinematically coupleable to the transmission gear wheel.

2. The drive system as claimed in claim 1, wherein the braking device is configured as an eddy current brake.

3. The drive system as claimed in claim 2, wherein the first part of the eddy current brake is connected in a non-rotatable manner to the transmission input shaft, and the second part is connected in a non-rotatable manner to the transmission gear wheel.

4. The drive system as claimed in claim 3, wherein the first part of the eddy current brake is connected to the clutch device.

5. The drive system as claimed in claim 4, wherein the second part of the braking device comprises a ferromagnetic region for generating the braking force.

6. The drive system as claimed in claim 5, wherein
    the first part of the braking device comprises an electrically-conductive region, and
    said electrically-conductive region comprises an electric coil or an electrically-conductive insert.

* * * * *